US012766439B2

(12) United States Patent
Ford et al.

(10) Patent No.: US 12,766,439 B2
(45) Date of Patent: Oct. 20, 2026

(54) AUTOMOTIVE COOLANT LIQUID DEAERATOR UNIT

(71) Applicant: PIERBURG PUMP TECHNOLOGY GMBH, Neuss (DE)

(72) Inventors: Gabriella Ford, Fountain Inn, SC (US); Stefano Fiorini, Fountain Inn, SC (US); Giorgio Peroni, Leghorn (IT); Brandon Woltz, Fountain Inn, SC (US); Eric Trombley, Fountain Inn, SC (US)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 342 days.

(21) Appl. No.: 18/293,361

(22) PCT Filed: Aug. 3, 2021

(86) PCT No.: PCT/EP2021/071665

§ 371 (c)(1),
(2) Date: Jan. 30, 2024

(87) PCT Pub. No.: WO2023/011707

PCT Pub. Date: Feb. 9, 2023

(65) Prior Publication Data

US 2024/0335767 A1 Oct. 10, 2024

(51) Int. Cl.

*B01D 53/02* (2006.01)
*B01D 19/00* (2006.01)

(52) U.S. Cl.

CPC ...... *B01D 19/0042* (2013.01); *F28F 2265/18* (2013.01)

(58) Field of Classification Search

CPC ... B01D 19/0042; F01P 11/028; F01P 11/029; F04D 13/0606; F04D 13/14; F04D 9/001; F28F 2265/18

See application file for complete search history.

(56) References Cited

U.S. PATENT DOCUMENTS 3,989,103 A * 11/1976 Cieszko ................ F28F 9/0231 165/110
4,182,404 A * 1/1980 Beveridge .............. B60K 11/02 165/104.31

(Continued)

FOREIGN PATENT DOCUMENTS

| | | | |
|---|---|---|---|
| DE | 38 13 654 | A1 | 11/1989 |
| DE | 10 2010 008 656 | A1 | 8/2011 |
| FR | 2 905 737 | A1 | 3/2008 |

OTHER PUBLICATIONS

Translation of FR2905737 (Year: 2008).*

*Primary Examiner* — Christopher P Jones
(74) *Attorney, Agent, or Firm* — Norman B. Thot

(57) ABSTRACT

A passive automotive coolant liquid deaerator unit for deaerating a circulating coolant liquid of a coolant circuit of an automobile. The passive automotive coolant liquid deaerator unit includes a deaerator housing which defines a deceleration chamber, and a baffle plate which is arranged substantially horizontally within the deceleration chamber. The deceleration chamber has a chamber liquid inlet, a chamber liquid outlet, and a deaeration opening which is arranged at a vertical top of the first deceleration chamber. The chamber liquid inlet is arranged vertically higher than the chamber liquid outlet. The baffle plate is arranged vertically between the chamber liquid inlet and the chamber liquid outlet.

20 Claims, 3 Drawing Sheets

(56) References Cited

U.S. PATENT DOCUMENTS

| | | | | |
|---|---|---|---|---|
| 2013/0020057 | A1 | 1/2013 | Suzuki et al. | |
| 2020/0009939 | A1 | 1/2020 | Potticary et al. | |
| 2022/0134906 | A1* | 5/2022 | Schoeneman | B60L 50/60 429/120 |

* cited by examiner

AUTOMOTIVE COOLANT LIQUID DEAERATOR UNIT

CROSS REFERENCE TO PRIOR APPLICATIONS

This application is a U.S. National Phase application under 35 U.S.C. § 371 of International Application No. PCT/EP2021/071665, filed on Aug. 3, 2021. The International Application was published in English on Feb. 9, 2023 as WO 2023/011707 A1 under PCT Article 21 (2).

FIELD

The present invention relates to a passive automobile coolant liquid deaerator unit for deaerating a circulating coolant liquid of a coolant circuit of an automobile.

BACKGROUND

Typical coolant liquid circuits in automotive applications are engine coolant circuits for an electrical traction engine or for an internal combustion traction engine, or can be traction battery coolant circuits or coolant circuits for secondary devices, for example, for turbochargers, for exhaust gas valves etc. An automotive coolant liquid circuit typically comprises a mechanical or an electric coolant liquid pump which circulates the coolant liquid in the coolant circuit. A typical type of coolant liquid pump is a flow pump.

The cooling capacity of the coolant liquid and the pumping rate of a flow pump are substantially deteriorated by gas/air bubbles carried with the coolant liquid current. The prior art has described an expansion tank at the vertically highest point of the coolant circuit so that the air bubbles can rise up to the expansion tank. When the coolant liquid pump is active and the coolant liquid is circulated in the coolant circuit, however, the air bubbles are carried with the circulating coolant liquid current so that the air bubbles can substantially remain within the circulating coolant liquid current and do not rise to the expansion tank. This effect is stronger and worse the higher the flow velocity of the coolant liquid in the coolant liquid circuit is.

DE 10 2010 008 656 A1 describes an air bubble separator which is provided in-line with a usual coolant liquid tube of the circuit. The air separation device causes turbulence in the relatively fast-flowing coolant liquid current so that the air bubble separator is not very effective.

SUMMARY

An aspect of the present invention is to provide an effective passive automotive coolant liquid deaerator device.

In an embodiment, the present invention provides a passive automotive coolant liquid deaerator unit for deaerating a circulating coolant liquid of a coolant circuit of an automobile. The passive automotive coolant liquid deaerator unit includes a deaerator housing which defines a first deceleration chamber, and a baffle plate which is arranged substantially horizontally within the first deceleration chamber. The first deceleration chamber comprises a chamber liquid inlet, a chamber liquid outlet, and a deaeration opening which is arranged at a vertical top of the first deceleration chamber. The chamber liquid inlet is arranged vertically higher than the chamber liquid outlet. The baffle plate is further arranged vertically between the chamber liquid inlet and the chamber liquid outlet.

BRIEF DESCRIPTION OF THE DRAWINGS

The present invention is described in greater detail below on the basis of embodiments and of the drawings in which.

DETAILED DESCRIPTION

Figure 1:
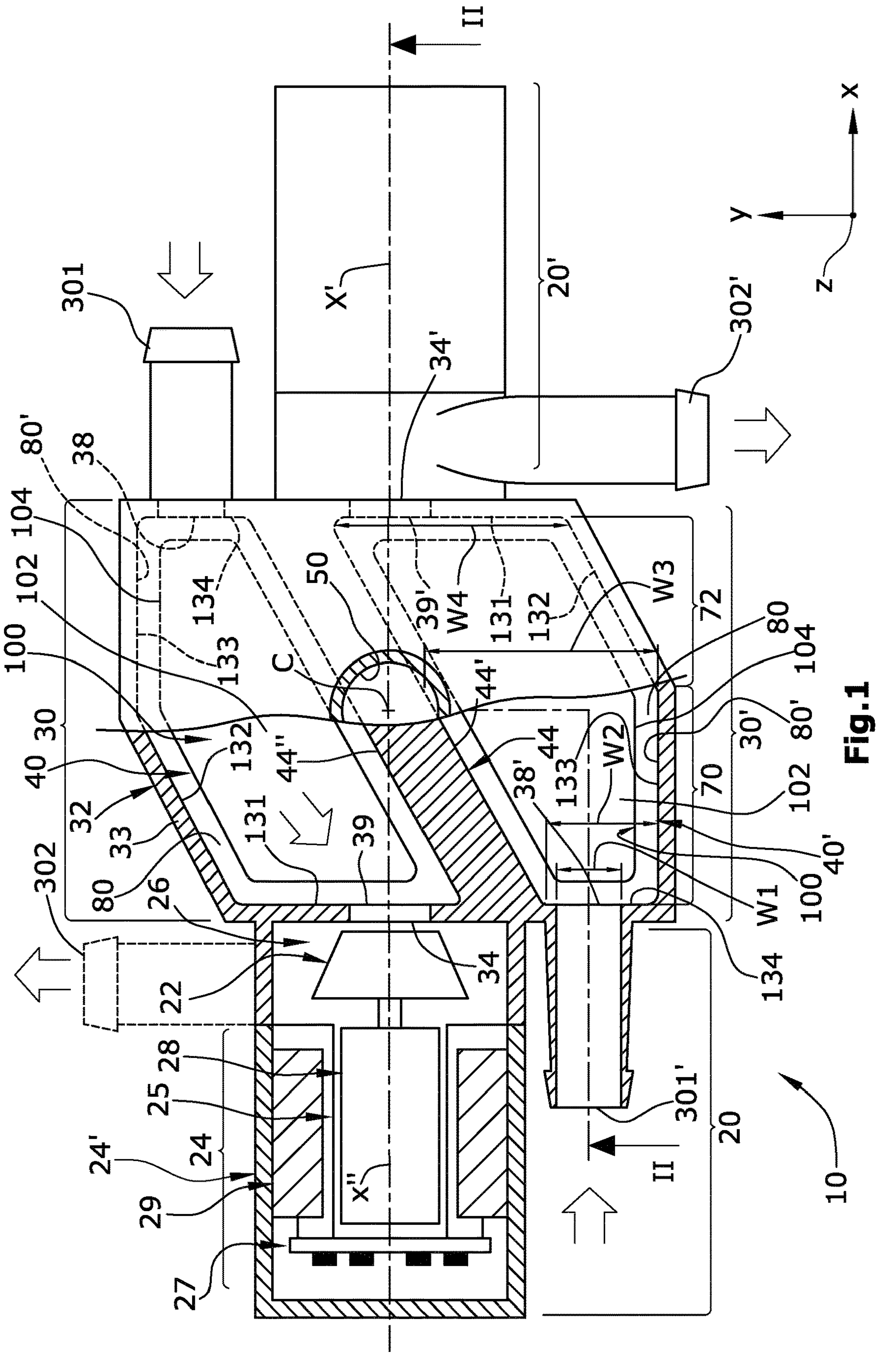
FIG. 1 shows a combined top view and a horizontal longitudinal section I-I of an integrated automotive electric liquid pump module comprising a twin coolant liquid deaerator unit according to the present invention.

The passive automotive coolant liquid deaerator unit according to the present invention is provided with a deaerator housing which defines a widened deceleration chamber with a chamber liquid inlet and a chamber liquid outlet for the coolant liquid which can, for example, be water. The deaerator housing is provided with a deaeration opening at the vertical top of the deceleration chamber.

The fluidic cross-section of the deceleration chamber is enlarged between the chamber liquid inlet and the chamber liquid outlet so that the flow velocity of the coolant liquid current within the deceleration chamber is substantially reduced.

The deaeration opening can be fluidically connected to the atmosphere or to an expansion tank. A semipermeable membrane can be provided between the deaeration opening and the atmosphere or the expansion tank, the semipermeable membrane being not permeable for the coolant liquid but being permeable for air.

The coolant liquid flow velocity reduction in the deceleration chamber has the effect that the pressure of the coolant liquid and of the gas bubbles within the deceleration chamber is reduced so that the gas bubbles expand and become lighter in specific weight, thereby increasing the hydrostatic uplift force of the gas bubbles.

The chamber liquid inlet and the chamber liquid outlet are both provided below the deaeration opening, whereby the chamber liquid inlet is provided vertically higher than the chamber liquid outlet. In other words, the liquid within the deceleration chamber has a slight downward flow component between the chamber liquid inlet and the chamber liquid outlet. A substantially horizontal baffle plate is arranged within the deceleration chamber and is arranged vertically between the chamber liquid inlet and the chamber liquid outlet. "Substantially horizontal" in the present context means that the baffle plate is substantially plane and is tilted in relation to a horizontal plane by less than 15° or is lying perfectly in a horizontal plane.

The coolant liquid entering the deceleration chamber flows around the substantially horizontal baffle plate to finally leave the deceleration chamber through the chamber liquid outlet. The baffle plate hinders a flow of the coolant liquid from the chamber liquid inlet to the chamber liquid outlet in a straight direct line, and much rather forces the coolant liquid to pass the baffle plate at the baffle plate's circumferential edge. The baffle plate edge defines together with the deceleration chamber sidewalls a ring-like bypass opening or several bypass openings through which the coolant liquid flows to the chamber liquid outlet. The local flow velocity of the coolant liquid right at the upside surface of the baffle plate is substantially reduced because of frictional effects so that the gas/air bubbles have more time to rise up to the deaeration opening. The baffle plate can, for example, be substantially fully surfaced, and is itself not provided with any kind of additional perforations or openings.

Experiments and tests have shown that the separation rate of the deaerator unit with the baffle plate arranged fluidically between the chamber liquid inlet and the chamber liquid outlet increases the separation rate by more than 10% compared to the same deceleration chamber without any baffle plate.

the present invention can also be used in nonautomotive applications, for example, in a static electronics cooling circuit.

The lowest edge of the opening of the chamber liquid inlet can, for example, be vertically higher than the highest edge of the opening of the chamber liquid outlet. The plane baffle plate lies in a horizontal plane without any substantial inclination with respect to the horizontal plane and is horizontally positioned between the lowest edge of the chamber liquid inlet opening and the highest edge of the chamber liquid outlet opening.

The baffle plate can, for example, block at least 50%, for example, at least 65% of the horizontal cross-section of the deceleration chamber in the plane defined by the baffle plate. The baffle plate can, for example, block less than 95%, for example, less than 90% of the horizontal cross-section of the deceleration chamber in the plane defined by the baffle plate. The baffle plate does not therefore substantially affect the total flow resistance of the deaerator unit, but has a substantial positive effect on the separation rate of the deaerator unit.

The contour of the baffle plate body can, for example, be geometrically substantially similar with the contour of the bottom wall of the deceleration chamber so that the vertical side walls of the deceleration chamber and the contour of the circumferential edge of the baffle plate body define a ring-like bypass opening with a constant opening width over the ring-like bypass opening circumference, for example, over the complete circumference.

The deaerator housing can, for example, be defined by a main housing body and a cover lid body. The main housing body and the cover lid body can, for example, both be made from a suitable plastic material and can, for example, be assembled and held together by screws, clips, gluing, welding etc. The deaerator main housing body defines a horizontal chamber bottom wall and all chamber side walls. The cover lid body defines the chamber top wall and directly holds the baffle plate body. The cover lid body can be provided with one or more substantially vertical holding arm(s) which hold the baffle plate in a defined vertical distance with respect to the chamber top wall. The cover lid body can, for example, be made from plastic and be a single body integrating the cover lid body, the holding arm, and the baffle plate body in one piece, and also defines the deaeration opening at the chamber top wall.

The deceleration chamber can, for example, have a cross-section widening zone with a continuous increase of the horizontal width from an initial width to an end width, which increase, for example, is a linear increase. Since the coolant liquid flow velocity is reduced significantly, a relatively short deceleration chamber, as seen in a flow direction, is sufficient to provide the gas bubbles enough time to rise up to the surface of the coolant liquid within the deceleration chamber. Since the fluidic cross-section of the deceleration chamber is continuously increasing, but only increases stepwise, massive turbulence within the deceleration chamber is avoided so that the rise of the gas bubbles to the coolant liquid surface is not disturbed.

At least 50% of the total cross-sectional increase between the chamber liquid inlet and the chamber liquid outlet is provided by the continuously cross-sectional increasing section of the deceleration chamber. It is not necessary to avoid any kind of a stepwise cross-sectional increase, but the non-continuous share should be as small as possible, and should, for example, be below 25% of the total cross-sectional increase between the chamber liquid inlet and the chamber liquid outlet.

The coolant liquid deaerator unit with the, at least in part, continuously cross-sectional increasing deceleration chamber provides a very effective degassing or deaeration of the coolant liquid current with separation rates of substantially more than 35%, and even higher, over the complete spectrum of possible general coolant flow rates in the coolant liquid circuit.

The continuous increase share is more than 50% of the total cross-sectional increase of the complete deceleration chamber, and is realized by an increasing horizontal width of the deceleration chamber, but not by a declining bottom wall of the deceleration chamber.

The bottom wall between the chamber liquid inlet and the chamber liquid outlet of the deceleration chamber can, for example, lie substantially in a horizontal plane. Since the deceleration chamber bottom wall, as seen in the flow direction, is not substantially declining, the liquid current flow within the deceleration chamber has no substantial downward component which can also cause the gas bubbles to have a downward flow direction component which would hinder a rising of the gas bubbles to the coolant liquid surface.

The cross section widening zone can, for example, begin right after the chamber liquid inlet, whereas a constant cross-section zone could be provided downstream of the cross-section widening zone. Since the cross-section widening zone could cause some liquid turbulence, the coolant liquid current is calmed after the cross-section widening zone so that the rise of the gas bubbles is substantially improved.

The coolant liquid deaerator unit can, for example, be a twin deaerator, and the deaerator housing can, for example, define a second deceleration chamber. The second widened deceleration chamber is substantially separated from the first deceleration chamber so that the two different coolant liquid flows flowing through the two deceleration chambers are substantially separated from each other and do not substantially mix with each other. The deaerator unit according to this aspect of the present invention therefore integrates two deaerator devices for two separate cooling liquid circuits.

The deaerator housing can, for example, be provided with a separation wall which directly separates the first deceleration chamber from the second deceleration chamber. The separation wall does not, however, necessarily completely fluidically separate the two deceleration chambers, but separates the lower liquid-containing parts of both deceleration chambers from each other so that the liquids of both cooling liquid circuits are not mixed. The separation wall defines a chamber side wall of the corresponding deceleration chambers, respectively.

The deaerator unit can, for example, be provided with a single gas outlet opening for both deceleration chambers so that the twin deaerator has only one single gas outlet opening.

The housing main body of the deaerator housing can, for example, define an axial liquid pump inlet opening which is axially aligned with the center of a flow pump wheel of a mechanical or an electrical coolant liquid pump. The axial liquid pump inlet opening is axially adjacent to the flow pump wheel. The flow pump wheel can, for example, be an impeller wheel, and the deaerator housing main body can, for example, define an outlet ring channel, for example, a volute-like ring channel, which radially surrounds the flow pump wheel. The deaerator housing main body can, for example, be a plastic body which defines in one integral piece at least four or five side walls of the deceleration chamber and also substantially defines the pumps outlet ring channel so that a separate (plastic) piece for defining the outlet ring channel can be avoided.

The largest cross-section within the deceleration chamber, as seen in the general flow direction, can, for example, be at least 80% larger, for example, more than 120% larger, than the cross section of the liquid inlet opening.

The deaerator housing can, for example, define the deceleration chamber, the deaerator liquid inlet opening, and the deaerator liquid outlet opening, be mechanically directly and stiffly connected to the liquid pump unit, and in particular be directly connected to a housing part of the liquid pump unit.

In other words, the flow pump unit and the passive deaerator unit are combined in one single integrated deaerator-pump-module. The fluidic properties of the flow pump unit and of the deaerator unit can be perfectly harmonized because the pump unit and the deaerator unit are fluidically directly connected to each other. Compared to a deaerator unit provided separately and remote from the pump unit, a separate connection tube and connection device to connect the two units are avoided so that the number of fluidic interfaces of the coolant liquid circuit is reduced.

The deaerator unit can, for example, be positioned fluidically upstream of the electric flow pump unit so that a relatively air-bubble-free coolant liquid current enters the flow pump unit, the fluidic efficiency of the flow pump unit is not deteriorated, and the flow pump unit always works efficiently.

An embodiment of the present invention is described below with reference to the enclosed drawings.

Figure 2:
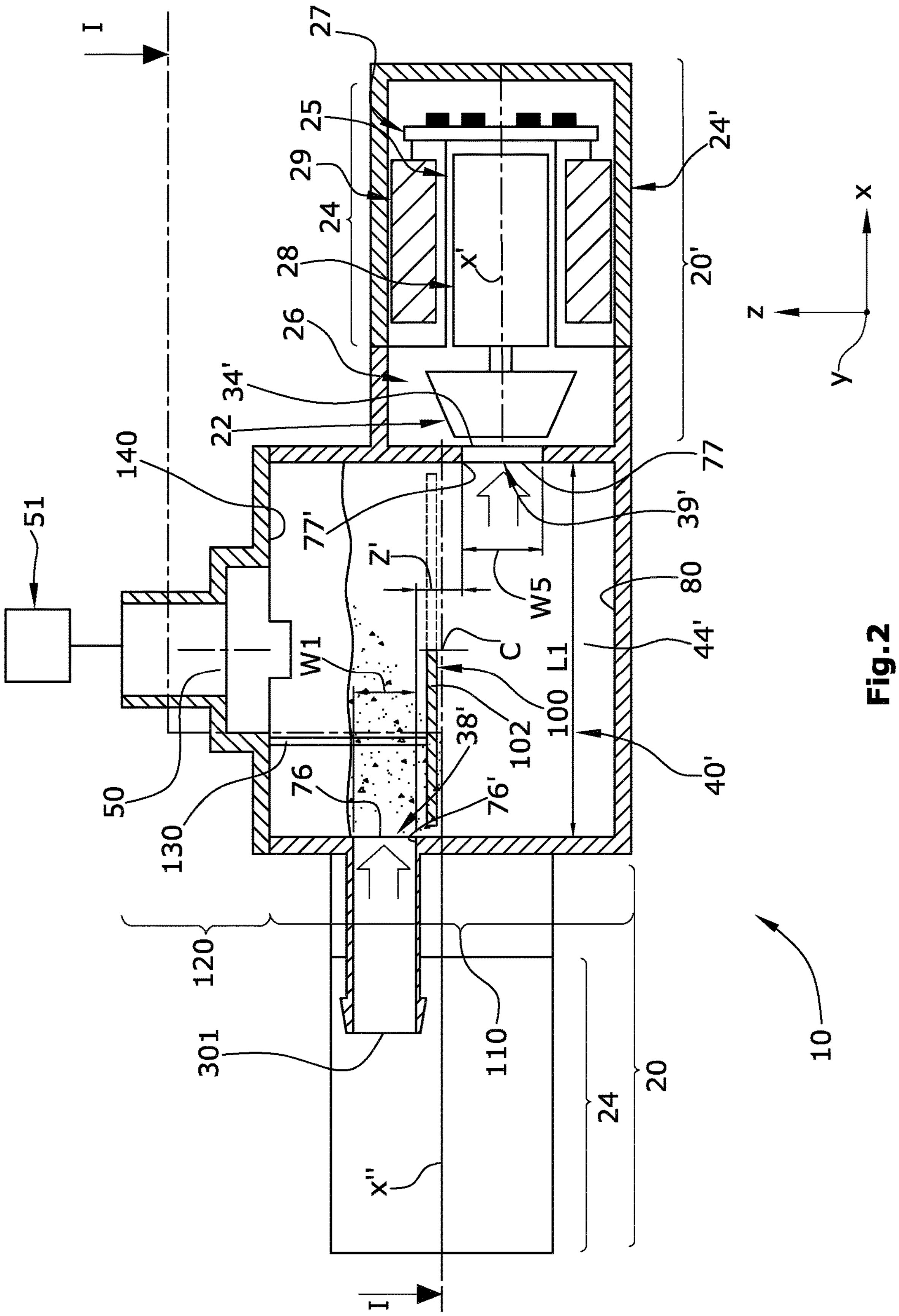
FIG. 2 shows a combined side view and a vertical longitudinal section II-II of the pump module including the twin coolant liquid deaerator unit of FIG. 1.

FIGS. 1 and 2 show an automotive electric liquid pump module 10 integrating two combined deaerator/pump combinations. The pump module 10 is used in an automotive application which means that low weight, very low production costs, high reliability, high vibration durability, and compactness are general requirements for the pump module 10. The pump module 10 is a twin module integrating two combined flow pump unit/deaerator unit combinations in one single pump module 10. The pump module 10 can circulate a coolant liquid in two different coolant circuits, for example, an automotive traction engine cooling circuit and a traction battery cooling circuit.

FIG. 1 shows a top view of two different horizontal planes XY and FIG. 2 shows a side view of different vertical planes XZ of the pump module 10. The pump module 10 comprises a first electrical flow pump unit 20, a fluidically related first passive deaerator unit 30, a second electrical flow pump unit 20', and a fluidically related second passive deaerator unit 30'. From a structural perspective, the first deaerator unit 30 and the second deaerator unit 30' are defined by one single plastic deaerator housing 32 which is made of a suitable plastic deaerator housing main body 33 and a suitable cover body so that the pump module 10 is substantially an assembly of two separate electrical flow pump units 20, 20' and the complete deaerator housing 32.

The two separate electrical flow pump units 20, 20' both have an identical structure, but can alternatively generally be different in their electric and hydraulic performance. In this embodiment, the electrical flow pump units 20, 20' are both provided with an electric can motor 24 having a separation can 25 which separates a wet motor section from a dry motor section. The motor electronics 27 and an electromagnetic motor stator 29 are provided in the dry section, whereas a permanently magnetized motor rotor 28 and a flow pump rotor 22 are provided in the wet section. The motor rotor 28 directly and coaxially drives the flow pump rotor 22 which is provided as an impeller with an axial pump wheel inlet and a radial pump wheel outlet.

The deaerator housing 32 defines a first widened deceleration chamber 40 and a second identical deceleration chamber 40'. The two deceleration chambers 40, 40' do not, however, necessarily need to be identical if the two connected cooling circuits and their cooling performance are not equal.

The cross section area of the two deceleration chambers 40, 40' dramatically widens after the corresponding chamber liquid inlet 38, 38' by more than 200% in relation to the cross section area of the opening of the corresponding chamber liquid inlet 38, 38' so that the liquid entering the deceleration chamber 40, 40' is dramatically decelerated and flows relatively slowly from the chamber liquid inlet 38, 38' to the corresponding chamber liquid outlet 39, 39'.

As shown in FIG. 1, the deceleration chamber 40, 40' has, right after the opening 76 of the chamber liquid inlet 38, 38', a cross section widening zone 70 with an initial horizontal width W2 which increases linearly to an end width W3. Downstream of and directly following the cross-section widening zone 70 is a constant cross-section zone 72 with a constant horizontal width W3, W4. The opening 76 of the chamber liquid inlet 38, 38' has a chamber liquid opening width W1 which is a diameter and which is about 60% of the initial horizontal width W2. The horizontal end width is about 200% of the initial horizontal width W2.

As can be seen in FIG. 2, the bottom wall 80 of the deceleration chambers 40, 40' is completely plane and lies in a horizontal plane XY. The chamber liquid inlet 38, 38' is located vertically higher than the corresponding chamber liquid outlet 39, 39'. The lowest edge 76' of the opening 76 of the chamber liquid inlet 38, 38' is provided vertically higher with a vertical offset Z' than the highest edge 77' of the chamber liquid outlet opening 77.

The gas/air bubbles entering the deceleration chambers 40, 40' together with the coolant liquid therefore has much time to rise to the top region of the respective deceleration chamber 40, 40', as shown in FIG. 2. The two deceleration chambers 40, 40' are substantially separated from each other by a separation wall 44 so that the coolant liquids of the two deceleration chambers and do not mix with each other.

Both deaerator units 30, 30' together have one single common deaeration opening 50 at the vertical top of the two deceleration chambers 40, 40' so that the two deceleration chambers 40, 40' are fluidically connected with each other and have the same fluid pressures. Each deaerator unit 30, 30' can alternatively have its own deaeration opening to fluidically completely separate both cooling circuits from each other. The deaeration opening 50 is fluidically connected to a compensation tank 51.

Figure 3:
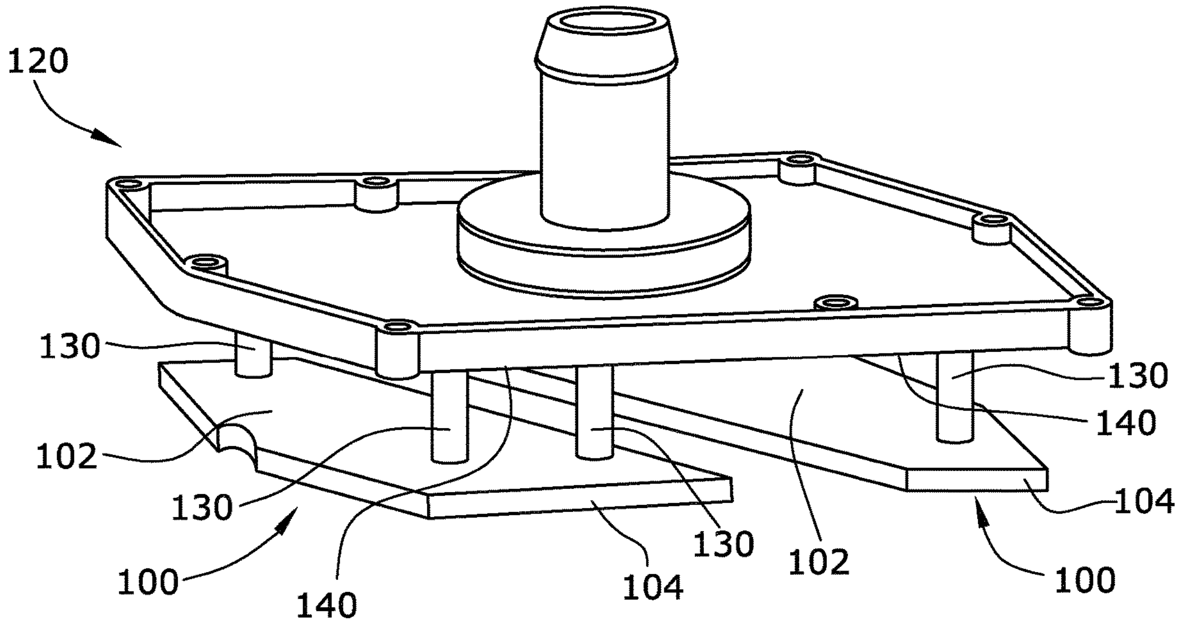
FIG. 3 shows a perspective view on a cover lid body of the deaerator housing of the deaerator unit of FIGS. 1 and 2.
Figure 4:
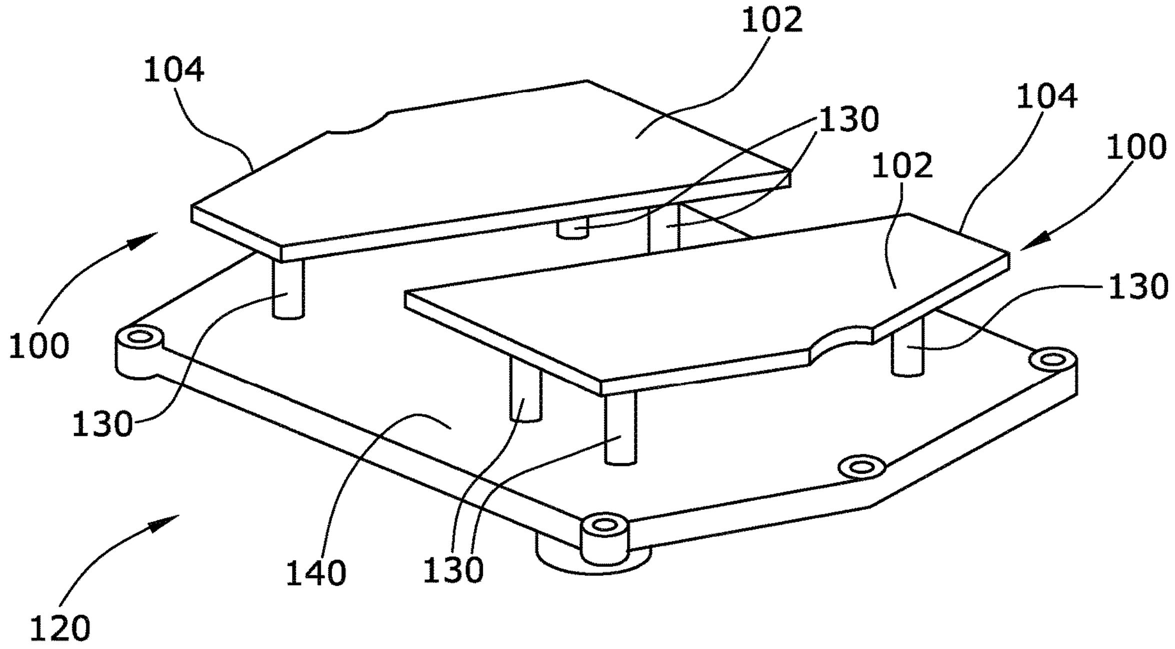
FIG. 4 shows another perspective view of the cover lid body of FIG. 3.

As shown in FIGS. 3 and 4, the deaerator housing 32 is defined by a main housing body 110 and a cover lid body 120, both being made of a suitable plastic material. The cover lid body 120 is assembled to the main housing body 110 by welding or gluing so that a fluid-tight connection of the two bodies 110, 120 is provided. The cover lid body 120 defines a horizontal chamber top wall 140 for both deaerator units 30, 30' and holds two horizontal baffle plates 100 at vertical holding arms 130, each baffle plate 100 being defined by a horizontal baffle plate body 102. The main housing body 110 defines a horizontal chamber bottom wall 80 and the five chamber side walls 44', 44", 131, 132, 133, 134 of both deaerator units 30, 30', respectively. The baffle plate 100 is arranged within the corresponding deceleration chamber 40, 40' vertically between the lowest edge 76' of the opening 76 of the chamber liquid inlet 38, 38' and the highest edge 77' of the chamber liquid outlet opening 77, respectively. The proximal chamber side walls 44', 44" of the two deceleration chambers 40, 40' are defined by the body of the separation wall 44.

As shown in FIG. 1, the contour 104 of the baffle plate body 102 is geometrically substantially similar with the contour 80' of the bottom wall 80 of the deceleration chamber 40, 40', but is smaller than the corresponding bottom wall contour 80', so that a five-sided ring-like bypass opening between the baffle plate 100, the separation side wall 44, and the five chamber side walls 44', 131, 132, 133, 134 is defined.

The since the twin deaerator unit 30, 30' is positioned fluidically upstream of the corresponding electrical flow pump unit 20, 20', the deaerator unit chamber liquid outlet 39, 39' defines the axial liquid pump inlet opening 34, 34', respectively, so that a deaerated liquid current axially enters the corresponding electrical pump unit 20, 20'. As can be seen in both drawings, the deaerator housing main body 33 substantially defines the outer circumference wall of the outlet ring channel 26 radially surrounding the corresponding flow pump rotor 22, and also defines the corresponding tangential pump outlet duct with the corresponding pump outlet opening 302, 302'. The deaerator housing main body 33 also defines both inlet ducts 301, 301' respectively leading to the deaerator unit liquid inlets 38, 38'. The deaerator housing main body 33 is directly connected to the motor housing 24'.

As shown in the drawings, the rotational axis' X", X' of both electrical flow pump units 20, 20' are provided perfectly coaxially with each other. The rotational axis' X", X' of both electrical flow pump units 20, 20' also perfectly intersect with the center of gravity C of the complete pump module 10.

The present invention is not limited to embodiments described herein; reference should be had to the appended claims.

LIST OF REFERENCE NUMERALS

10 Automotive electric liquid pump module/Pump module
20 First electrical flow pump unit
20' Second electrical flow pump unit
22 Flow pump rotor
24 Electric can motor
24' Motor housing
25 Separation can
26 Outlet ring channel
27 Motor electronics
28 Motor rotor
29 Electromagnetic motor stator
30 First passive deaerator unit
30' Second passive deaerator unit
32 Deaerator housing
33 Deaerator housing main body
34 Axial liquid pump inlet opening
34' Axial liquid pump inlet opening
38 Chamber liquid inlet
38' Chamber liquid inlet
39 Chamber liquid outlet
39' Chamber liquid outlet
40 First deceleration chamber
40' Second deceleration chamber
44 Separation wall
44' Chamber side wall
44" Chamber side wall
50 Deaeration opening
51 Compensation tank
70 Cross-section widening zone
72 Constant cross-section zone
76 Opening (of the chamber liquid inlet)
76' Lowest edge (of the opening of the chamber liquid inlet)
77 Chamber liquid outlet opening
77' Highest edge (of chamber liquid outlet opening)
80 Bottom wall
80' Bottom wall contour
100 Baffle plate
102 Baffle plate body
104 Contour (of baffle plate body)
110 Main housing body
120 Cover lid body
130 Vertical holding arm
131 Chamber side wall
132 Chamber side wall
133 Chamber side wall
134 Chamber side wall
140 Chamber top wall
301 Inlet duct
301' Inlet duct
302 Pump outlet opening
302' Pump outlet opening
C Center of gravity
L1 Deceleration chamber length
W1 Chamber liquid opening width (of chamber liquid inlet)
W2 Initial horizontal width
W3 End width
W4 Horizontal width
W5 Height of chamber liquid outlet opening
X' Rotational axis
X" Rotational axis
Z' Vertical offset

What is claimed is:

1. A passive automotive coolant liquid deaerator unit for deaerating a circulating coolant liquid of a coolant circuit of an automobile, the passive automotive coolant liquid deaerator unit comprising:

a deaerator housing which defines a first deceleration chamber, the deaerator housing being defined by a main housing body which comprises first deceleration chamber sidewalls, the first deceleration chamber comprising a first deceleration chamber liquid inlet, a first deceleration chamber liquid outlet, and a first deceleration deaeration opening which is arranged at a vertical top of the first deceleration chamber; and a first deceleration chamber baffle plate which is arranged substantially horizontally within the first deceleration chamber, wherein, the first deceleration chamber liquid inlet is arranged vertically higher than the first deceleration chamber liquid outlet, the first deceleration chamber baffle plate is further arranged vertically between the first deceleration chamber liquid inlet and the first deceleration chamber liquid outlet, the first deceleration chamber baffle plate comprises an outside edge, and the outside edge of the first deceleration chamber baffle plate and the first deceleration chamber sidewalls define at least one ring-like bypass opening through which the circulating coolant liquid flows to the first deceleration chamber liquid outlet.

2. The passive automotive coolant liquid deaerator unit as recited in claim 1, wherein, the first deceleration chamber liquid inlet has an opening having a lowest edge, the first deceleration chamber liquid outlet has an opening having a highest edge, the lowest edge of the opening of the first deceleration chamber liquid inlet is vertically higher than the highest edge of the opening of the first deceleration chamber liquid outlet, and the first deceleration chamber baffle plate is arranged horizontally between the lowest edge of the opening of the first deceleration chamber liquid inlet and the highest edge of the opening of the first deceleration chamber liquid outlet and lies in a horizontal plane.

3. The passive automotive coolant liquid deaerator unit as recited in claim 1, wherein, the first deceleration chamber has a horizontal cross-section, and the first deceleration chamber baffle plate is configured to block at least 50% of the horizontal cross-section of the first deceleration chamber.

4. The passive automotive coolant liquid deaerator unit as recited in claim 1, wherein, the first deceleration chamber further comprises a first deceleration bottom wall which has a contour, the first deceleration chamber baffle plate comprises a body which has a contour, and the contour of the body of the first deceleration chamber baffle plate is geometrically similar to the contour of the first deceleration bottom wall.

5. The passive automotive coolant liquid deaerator unit as recited in claim 4, wherein, the deaerator housing is further defined by a cover lid body which comprises a chamber top wall, and the cover lid body is configured to hold the body of the first deceleration chamber baffle plate.

6. The passive automotive coolant liquid deaerator unit as recited in claim 1, wherein, the first deceleration chamber further comprises a first deceleration cross-section widening zone, and the first deceleration cross-section widening zone has a horizontal width which is arranged to continually increase from an initial width to an end width.

7. The passive automotive coolant liquid deaerator unit as recited in claim 6, wherein the continual increase of the horizontal width of the first deceleration cross-section widening zone from the initial width to the end width is linear.

8. The passive automotive coolant liquid deaerator unit as recited in claim 6, wherein the first deceleration cross-section widening zone begins right after the first deceleration chamber liquid inlet.

9. The passive automotive coolant liquid deaerator unit as recited in claim 1, wherein the first deceleration chamber further comprises a first deceleration chamber fluidic cross section which continuously increases between the first deceleration chamber liquid inlet and the first deceleration chamber liquid outlet.

10. The passive automotive coolant liquid deaerator unit as recited in claim 1, wherein the deaerator housing further defines a second deceleration chamber which is arranged to be substantially separate from the first deceleration chamber, the second deceleration chamber comprising a second deceleration chamber liquid inlet, a second deceleration chamber liquid outlet, and a second deceleration deaeration opening which is arranged at a vertical top of the second deceleration chamber; and a second deceleration chamber baffle plate which is arranged substantially horizontally within the second deceleration chamber, wherein, the second deceleration chamber liquid inlet is arranged vertically higher than the second deceleration chamber liquid outlet, the second deceleration chamber baffle plate is further arranged vertically between the second deceleration chamber liquid inlet and the second deceleration chamber liquid outlet, the main body of the deaerator housing further comprises second deceleration chamber sidewalls, the second deceleration chamber baffle plate comprises an outside edge, and the outside edge of the second deceleration chamber baffle plate and the second deceleration chamber sidewalls define at least one ring-like bypass opening through which the circulating coolant liquid flows to the second deceleration chamber liquid outlet.

11. The passive automotive coolant liquid deaerator unit as recited in claim 10, wherein, the second deceleration chamber liquid inlet has an opening having a lowest edge, the second deceleration chamber liquid outlet has an opening having a highest edge, the lowest edge of the opening of the second deceleration chamber liquid inlet is vertically higher than the highest edge of the opening of the second deceleration chamber liquid outlet, and the second deceleration chamber baffle plate is arranged horizontally between the lowest edge of the opening of the second deceleration chamber liquid inlet and the highest edge of the opening of the second deceleration chamber liquid outlet and lies in a horizontal plane.

12. The passive automotive coolant liquid deaerator unit as recited in claim 10, wherein, the second deceleration chamber has a horizontal cross-section, and the second deceleration chamber baffle plate is configured to block at least 50% of the horizontal cross-section of the second deceleration chamber.

13. The passive automotive coolant liquid deaerator unit as recited in claim 10, wherein, the second deceleration chamber further comprises a second deceleration bottom wall which has a contour, the second deceleration chamber baffle plate comprises a body which has a contour, and the contour of the body of the second deceleration chamber baffle plate is geometrically similar to the contour of the second deceleration bottom wall.

14. The passive automotive coolant liquid deaerator unit as recited in claim 13, wherein the cover lid body is further configured to hold the body of the second deceleration chamber baffle plate.

15. The passive automotive coolant liquid deaerator unit as recited in claim 10, wherein, the second deceleration chamber further comprises a second deceleration cross-section widening zone, and the second deceleration cross-section widening zone has a horizontal width which is arranged to continually increase from an initial width to an end width.

16. The passive automotive coolant liquid deaerator unit as recited in claim 15, wherein the continual increase of the horizontal width of the second deceleration cross-section widening zone from the initial width to the end width is linear.

17. The passive automotive coolant liquid deaerator unit as recited in claim 15, wherein the second deceleration cross-section widening zone begins right after the second deceleration chamber liquid inlet.

18. The passive automotive coolant liquid deaerator unit as recited in claim 10, wherein the second deceleration chamber further comprises a second deceleration chamber fluidic cross section which continuously increases between the second deceleration chamber liquid inlet and the second deceleration chamber liquid outlet.

19. The passive automotive coolant liquid deaerator unit as recited in claim 10, wherein, the deaerator housing comprises a separation wall which is arranged to directly separate the first deceleration chamber from the second deceleration chamber, and the separation wall defines a first deceleration chamber side wall of the first deceleration chamber and a second deceleration chamber side wall of the second deceleration chamber.

20. The passive automotive coolant liquid deaerator unit as recited in claim 10, wherein the first deceleration deaeration opening and the second deceleration deaeration opening is arranged as a same gas outlet opening.

* * * * *